(No Model.) 2 Sheets—Sheet 1.
J. W. BLAKE & J. T. SACKETT.
CARBURETED HYDROGEN GAS GENERATOR AND BURNER.
No. 475,381. Patented May 24, 1892.
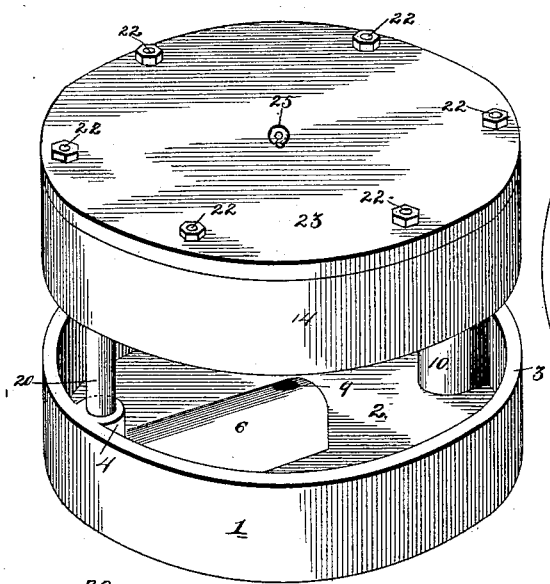
Fig. 1.
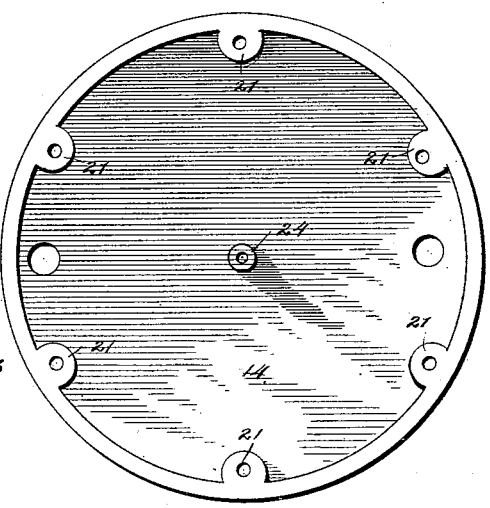
Fig. 3.
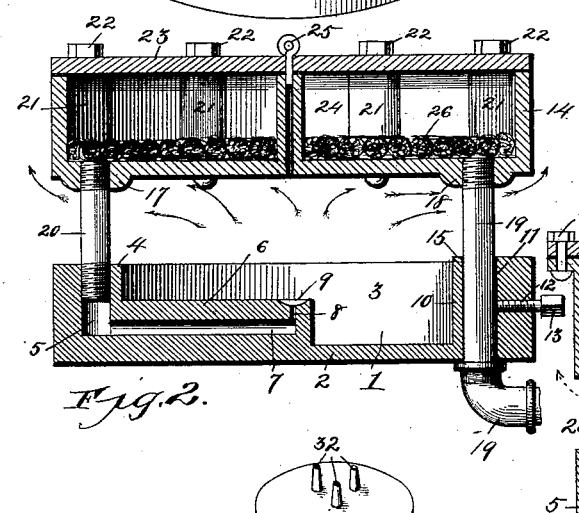
Fig. 2.
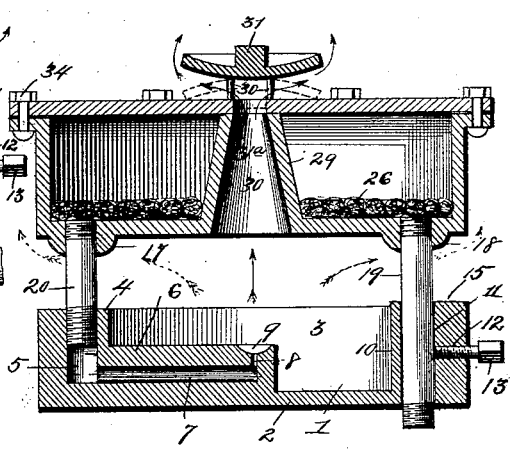
Fig. 4.
Fig. 5.
Witnesses:
Inventors:
John W. Blake, and
Joseph T. Sackett,
By Higdon & Higdon,
Attorneys.

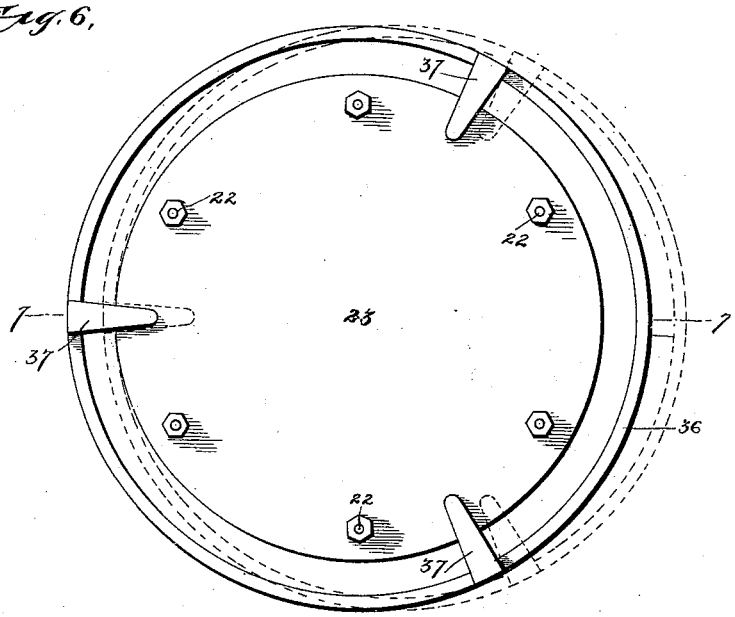
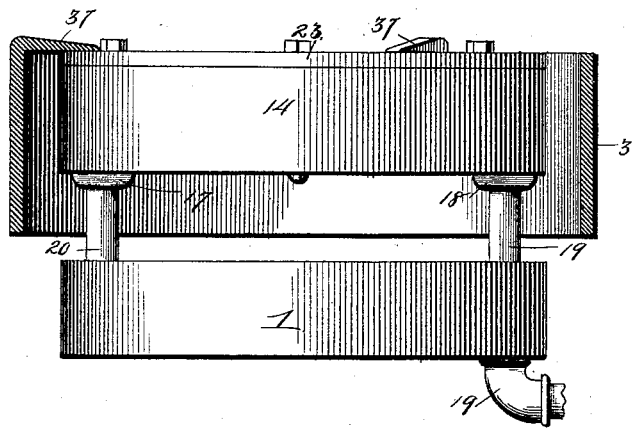

UNITED STATES PATENT OFFICE.

JOHN W. BLAKE AND JOSEPH T. SACKETT, OF KANSAS CITY, MISSOURI, ASSIGNORS OF ONE-THIRD TO FRANK ST. AUBYN, OF SAME PLACE.

CARBURETED-HYDROGEN-GAS GENERATOR AND BURNER.

SPECIFICATION forming part of Letters Patent No. 475,381, dated May 24, 1892.

Application filed April 4, 1891. Serial No. 387,635. (No model.)

*To all whom it may concern:*

Be it known that we, JOHN W. BLAKE and JOSEPH T. SACKETT, of Kansas City, Jackson county, Missouri, have invented certain new and useful Improvements in Carbureted-Hydrogen-Gas Generators and Burners, of which the following is a full, clear, and exact description, reference being had to the accompanying drawings, forming a part hereof.

Our invention relates to carbureted-hydrogen-gas generators and burners; and the objects of our invention are to produce a generator and burner which shall be simple, compact, and durable in construction, and which shall be applicable to various types of stoves, heating-furnaces, steam-generators for heating barrels, and for various other analogous purposes, and by means of which a perfect generation and combustion of the carbureted-hydrogen gas shall be effected.

A further object of our invention is to produce a carbureted-hydrogen-gas generator the interior of which shall be easily accessible, so that the deposits of solid matter resulting from the combustion of the fluid can be readily removed from the generator and the latter be quickly renovated for further use.

A still further object of our invention is to produce means whereby the initial course of the flame and the products of combustion can be regulated as desired, so as to be applied effectively to the surfaces to be heated by the combustion of the gas.

Another object of our invention is to produce means whereby the passages of the burner can be readily freed from the accumulation of solid matter, so that the flow of the gas shall be entirely free and unobstructed, thus effectively utilizing the maximum heating capacity of the gas.

To the above purposes our invention consists in certain peculiar and novel features of construction and arrangement, as hereinafter described and claimed.

In order that our invention may be fully understood, we will proceed to describe it with reference to the accompanying drawings, in which—

Figure 1 is a perspective view of a gas generator and burner embodying our invention. Fig. 2 is a central transverse vertical section of the generator shown in Fig. 1. Fig. 3 is a plan view of a gas-generating chamber with its cover removed. Fig. 4 is a central transverse vertical section of a modified form of generator and burner constructed in accordance with our invention. Fig. 5 is a detached perspective view of the closing and deflecting cap for the burner shown in Fig. 4. Fig. 6 is a plan view of the generator shown in Fig. 4 provided with our improved movable deflecting-casing. Fig. 7 is a transverse vertical section of the same on the line 7 7 of Fig. 6.

Referring first to the construction shown in Figs. 1, 2, and 3, 1 designates the generating-chamber of our improved device. This generating-chamber for generating gas and burning the same is preferably of circular form in marginal contour; but the particular form can be varied to any desired extent, and is provided with a closed bottom 2, from which the sides of the generator rise. At one point the side of this generator is formed with an inwardly-extending enlargement or offset 4, which is formed with a vertical channel 5, the upper part of which is internally screw-threaded, for a purpose to be hereinafter explained. Upon the bottom 2 of this generator is formed an enlargement 6, which extends from the enlargement or offset 4 a little past the middle or center of the generator 1, the said enlargement being formed integrally with the offset 4 and also with the bottom of the generator. A longitudinal channel or passage 7 is formed in this enlargement 6, the outer end of said channel communicating with the lower end of the channel 5 of the offset 4. The inner end of this channel 7 communicates with the lower end of a short channel 8, which extends vertically through the inner end of the upper side of the enlargement 6, and the upper end of this channel 8 communicates with a cup-shaped cavity 9, which is countersunk in the upper side of the top of enlargement 6, near the inner end thereof. At a point opposite from the offset 4 the side of the reservoir 1 is formed with a second inwardly-extending enlargement or offset 10, through which is formed a smooth vertical socket or channel 11, said channel opening at its lower end at the bottom of the generator and at its upper end at the top of the offset. An internally-screw-threaded horizontal opening 12 is formed through the side of the generator 1 and communicates at its inner end with the channel or bore of the offset 10, and within this opening 12 is inserted the stem of a set-screw 13. It is to be observed that the upper end 15 of the enlargement or offset 10 extends above the level of the top of the burner-wall 2, and the purpose of this arrangement will also be presently explained.

14 designates the generator of the device, the said generator being preferably of circular marginal contour or of such other forms as to correspond with the burner 1, just described. At opposite points near its margin the bottom of this gas-generator is formed with two downwardly-extending bosses 17 18, which are each internally screw-threaded. One of these bosses receives the externally-screw-threaded upper end of the main feed-pipe 19, the said pipe extending upward through the bore of the offset 10 and being held securely in said bore by the set-screw 13, the inner end of which binds firmly upon the pipe. The opposite boss 17 receives the externally-screw-threaded upper end of a conduit-pipe 20, the lower end of which is also externally screw-threaded to enter the upper end of the channel 5 of the offset 4. That portion of the feed-pipe 19 which lies within the bore of the enlargement 10 is surrounded with a packing of asbestus fiber, mineral wool, or other suitable non-combustible subtance, and the said pipe communicates at its outer end with a suitable tank or reservoir of liquid oil. On the inner side of the wall of this gas generator are formed a number of inwardly-extending enlargements or offsets 21, each of which is formed with a vertical socket, the said sockets being designed to receive a similar number of bolts 22ª. The top of this gas-generator 14 is closed by a removable cover 23, which is preferably of circular marginal contour or of such other form as to correspond with the sides of the said generator, upon which the said cover rests. This cover is held securely and tightly and also removably in position by nuts screwed upon the upper ends of the bolts 22ª, the said bolts passing upward through the cover.

At the middle or center of the bottom of the gas-generator 14 is formed a hollow boss 24, which extends vertically upward from the upper side of said bottom and the upper end of which is flush with the upper edge of the wall of said chamber. The bore of this boss 24 extends vertically through it and opens at its lower and upper ends, respectively, through the bottom of the generator and at the upper end of the boss. A pin or plug 25 is inserted downward through an opening in the center or middle of the cover 23 and its lower end enters and closes the top of the bore of the boss 24, as shown in Fig. 2. Upon the bottom of the chamber 14 is placed a layer 26 of asbestus, mineral wool, or other suitable non-combustible substance, as shown in Fig. 2.

In using the burner above described the said burner is placed in the fire-chamber of a stove, furnace, or the fire-chamber of a steam-generator or other structure, and is supported therein in any suitable or preferred manner. The oil is now allowed to flow through the pipe 19 into the gas-generator 14 and through the latter, escaping out through the conduit-pipe 20. From the conduit-pipe 20 the oil flows through the channels 5, 7, and 8 and, overflowing the cavity 9, fills or partially fills the cavity of the burner 1, while the upwardly-projecting upper end 15 of the enlargement 10 prevents the oil from entering between the pipe 19 and the interior of the said enlargement. A lighted match or a flame of any kind is now applied to the body of the oil in the cavity of the burner 1, and the flame resulting from the combustion of the fluid impinges upon the bottom of the gas-generator 14. By the time the fluid in the cavity of the burner has been consumed the oil in the gas-generator has been transformed into gas, which flows through the conduit-pipe 20 and channels 5, 7, and 8 and emerges through the cavity 9, impinging on the bottom of the generator 14, and mingling with air, thus forming a flame of great heat. The flame now impinges upon the bottom of the gas-generator 14, as indicated by the arrows in Fig. 2, and continually vaporizes the oil flowing into the same through the feed-pipe 19.

As the burner continues in use there will be more or less solid carbon deposited in and absorbed by the asbestus layer 26 in the generator 14, and it is necessary occasionally to remove this layer and free it from its solid deposit. This is quickly accomplished by simply removing the cover 23, the bolts 22 being first withdrawn. After thus removing the cover 23 the layer 26 can be readily lifted out, cleansed, and replaced or a fresh layer substituted for it, and this without deranging the general structure of the generator. It is to be further observed that as the burner continues in use slight accumulations of solid matter may be deposited in the short channel 8, although this deposit will be reduced to the minimum by the filtering action of the layer 26 in the generator. Such slight accumulations can be instantly removed from the channel 8 by simply removing the plug 25 and inserting a wire through the bore of the boss 24 and downward into the channel 8, the bore of the boss and the channel 8 being in vertical alignment, and the bore of the said boss and the cup-shaped or countersunk cavity 9 serving as guides to direct the wire into the channel 8.

The burner shown in Fig. 4 is in general construction similar to that above described, and like parts in both structures are designated by like numerals of reference. In this instance, however, an enlarged boss 29 of frusto-conical form is formed upon the center or middle of the bottom of the gas-generator 14 in lieu of the form of boss 24, above described. The boss 29 is of such height that its upper end comes flush with the top of the wall of the generator 14, and the interior cavity 30 of this boss gradually diminishes in area from its lower end, which opens through the bottom of the generator 14 to its upper end, which opens through the upper end of the boss 29. The top 23 of this gas-generator is formed at its center or middle with an opening or aperture 31ª, which corresponds in position with the opening before described at the upper end of the bore of the boss 24, but which is larger than said opening.

32 designates a deflector, which is of concavo-convex form and which is formed on the center of the concave side with a projection 31, which is of such width and form as to exactly fit into the opening 31ª of the top or cover and thus close the same. At the middle or center of the convex side of the deflector are formed a number of projections 32, of substantially the form and arrangement shown in Fig. 5. In this instance the upper edge of the wall of the generator 14 is shown as formed with an outwardly-extending flange 28, through which extends the bolts 33, said bolts also extending through the cover 23 and being each provided with a nut 34, which removably secures the cover in position upon the gas-generator. In using this burner the course of the oil and gas is the same as that previously described; but in this instance the concavo-convex deflector 30 is first placed with its concave side downward and with the projection 31 fitted into the opening in the top of the gas-generator. The body of liquid in the cavity of the burner 1 being lighted, as before, the smoke and products of combustion are caused to flow beneath the bottom of the gas-generator and are allowed to escape around the sides of the latter, as indicated by arrows in Fig. 4, thereby presenting a larger area of heating-surface. As soon as the mass of oil in the burner has been consumed and the vaporizing action is started the deflector is or may be removed and inverted with its projections 32 resting on the top of the gas-generator, as shown in the solid lines in Fig. 4. The heat which was at first excluded from the interior of the boss 29 is now permitted to flow upward through the channel in the boss, and is thus caused to aid in vaporizing the oil within the generator, the deflector throwing the flame downward upon the cover of the generator, heating the same, and thus further assisting in the vaporization of the oil.

In Figs. 6 and 7 we have shown either of the forms of the burners described above provided with a movable ring or casing for effectively directing the flow of heat against the sides of the gas-generator 14. In these figures, 35 designates the movable ring or casing, which is preferably of cylindrical form or of such other forms as to correspond with that of the gas-generator and of greater diameter or width internally than the gas-generator 14 is externally. At its upper edge this ring or casing is formed with two or more lugs or projections 37, which extend radially in from the casing. When this ring or casing is in position, the lugs 37 rest upon the top of the gas-generator 14 and the casing extends downward along the side of the said chamber, the said casing being of such height that its lower edge comes below the level of the bottom of the gas-generator, as shown in Fig. 7. Now after the burner has been lighted and is in normal operation, as above described, it will be seen that the heat and products of combustion will be caused to flow upward between the inner surface of the ring or casing and the outer side of the gas-generator, and thus the full heating capacity of the burner will be utilized both for vaporizing the oil and for generating steam or for other heating purposes, and thus, also, the walls of the fire-chamber in which the device is placed are prevented from being burned out by the intense heat.

Should it be desired to utilize more of the heat on one side of the generator than the other for any purpose, it is accomplished simply by moving the casing 36 so that one of its inner surfaces comes close to or in contact with the outer side of the generator, as indicated in dotted lines in Fig. 6. Thus all or a portion of the heat can be excluded from one side of the generator and be caused to flow upward along the remainder of the same.

From the above description it will be seen that we have provided a simple, durable, and comparatively inexpensive form of gas generator and burner in which the products of combustion are most effectively utilized both for generating gas and for general heating purposes. The gas-generator, being located directly over the burner, causes the products of combustion to impinge directly upon the generator, and thus effectively and quickly generate gas from the fluid oil therein. It will also be seen that the generator can be quickly and readily freed from accumulations of solid carbon and of other solid matter without disarranging the general structure, and also that the passages of the burner can be quickly freed of accumulations of such solid carbon. Finally, it will be seen that the heat can be readily diverted so as to insure its application at precisely the points required without necessitating any structural alteration of the generator and burner or any alteration of its position.

Having thus described our invention, what we claim as new therein, and desire to secure by Letters Patent, is—

1. An improved carbureted-hydrogen-gas generator and burner comprising a circular burner having a depressed bottom and a raised circular margin, a pair of oppositely-disposed vertical bosses formed on the inner side of said margin and having each a vertical passage or channel, a horizontal boss formed upon the bottom of the burner and having a longitudinal channel communicating at its outer end with the channel of one of the vertical bosses and extending radially inward from said boss to and beyond the center of the burner, a cavity at the inner end of the horizontal boss and communicating through a short vertical channel with the inner end of the horizontal channel of the boss, a generator also of circular form and located immediately above the burner and provided with a central vertical hollow boss, the channel of which is in vertical alignment with that at the inner end of the horizontal boss of the burner, a feed-pipe entering the bottom of the burner and passing through the channel of the second burner-boss and also detachably connected at its upper end to the bottom of the generator, a set-screw for retaining the burner upon the feed-pipe, and a supply-pipe leading downward from the opposite side of the bottom of the generator and entering the channel of the first burner-boss, and a removable cover for said generator, substantially as described.

2. An improved carbureted-hydrogen-gas generator and burner comprising a circular burner having a depressed bottom and a raised circular margin, a pair of oppositely-disposed vertical bosses formed on the inner side of said margin and having each a vertical passage or channel, a horizontal boss formed upon the bottom of the burner and having a longitudinal channel communicating at its outer end with the channel of one of the vertical bosses and extending radially inward from said boss to and beyond the center of the burner, a cavity at the inner end of the horizontal boss and communicating through a short vertical channel with the inner end of the channel of the horizontal boss, a generator also of circular form and located immediately above the burner and provided with a central vertical hollow boss, the channel of which is in vertical alignment with that at the inner end of the horizontal boss of the burner, a feed-pipe entering the bottom of the burner and passing through the channel of the second burner-boss and also detachably connected at its upper end to the bottom of the generator, a set-screw for retaining the burner upon the feed-pipe, a supply-pipe leading downward from the opposite side of the bottom of the generator and entering the channel of the first burner-boss, a removable cover for said generator, and a ring having inwardly-extending radial studs to rest removably upon the generator-cover, said ring being of such length as to extend downward below the bottom of the generator, substantially as set forth.

In testimony whereof we affix our signatures in presence of two witnesses.

JOHN W. BLAKE.
JOSEPH T. SACKETT.

Witnesses:
JNO. L. CONDRON,
H. E. PRICE.